US006954038B2

(12) United States Patent
Ido et al.

(10) Patent No.: US 6,954,038 B2
(45) Date of Patent: Oct. 11, 2005

(54) ELECTRONIC BALLAST FOR A DISCHARGE LAMP

(75) Inventors: Shigeru Ido, Shijonawate (JP); Naoki Onishi, Hirakata (JP); Takashi Kanda, Hirakata (JP)

(73) Assignee: Matsushita Electric Works, Ltd., Osaka (JP)

( * ) Notice: Subject to any disclaimer, the term of this patent is extended or adjusted under 35 U.S.C. 154(b) by 25 days.

(21) Appl. No.: 10/489,416

(22) PCT Filed: May 23, 2003

(86) PCT No.: PCT/JP03/06494

§ 371 (c)(1),
(2), (4) Date: Mar. 12, 2004

(87) PCT Pub. No.: WO03/101151

PCT Pub. Date: Dec. 4, 2003

(65) Prior Publication Data

US 2004/0239262 A1 Dec. 2, 2004

(30) Foreign Application Priority Data

May 28, 2002 (JP) ........................................ 2002-154804

(51) Int. Cl.⁷ .............................................. H05B 37/02
(52) U.S. Cl. .................... 315/291; 315/307; 315/209 R; 315/224; 315/219; 315/DIG. 4; 315/DIG. 7
(58) Field of Search ................................ 315/291, 307, 315/209 R, 224, 293, 308, 324, 219, 292, DIG. 4, DIG. 7

(56) References Cited

U.S. PATENT DOCUMENTS

| 5,315,214 A | 5/1994 | Lesea |
| 5,365,151 A | 11/1994 | Spiegel et al. |
| 5,394,064 A | 2/1995 | Ranganath et al. |
| 5,559,395 A | * 9/1996 | Venkitasubrahmanian et al. ........................ 315/247 |
| 5,583,402 A | * 12/1996 | Moisin et al. ............... 315/307 |
| 5,691,605 A | * 11/1997 | Xia et al. .................... 315/307 |
| 5,936,357 A | 8/1999 | Crouse et al. |
| 6,259,215 B1 | 7/2001 | Roman |

FOREIGN PATENT DOCUMENTS

JP 06-076979 A1 3/1994

OTHER PUBLICATIONS

International Search Report for PCT/JP03/06494 mailed on Jan. 15, 2004.
Matthias Radecker, Fraunthofer–Institute of Microelectronic Circiuts and Systems, IMS Duisburg, Germany "Integrated Circuit Design and Application for Electronic Ballasts".
Tai–Fu Wu, Senior Member, IEEE, and Te–Hung Yu, "An Electronic Dimming Ballast with Bifrequency and Fuzzy Logic Control" IEEE Transaction on Industry Applications, vol. 36, No. 5, Sep./Oct. 2000.

* cited by examiner

*Primary Examiner*—Don Wong
*Assistant Examiner*—Chuc Tran
(74) *Attorney, Agent, or Firm*—Rader, Fishman & Grauer PLLC

(57) ABSTRACT

An electronic ballast for a discharge lamps has a dimming control for varying an input DC voltage and an input driving frequency in combination to achieve a lamp dimming in accordance with a dimmer demand. The ballast includes a dimming processor with a memory for storing a table that gives a predetermined relation between the dimming demand and a voltage command designating the input DC voltage as well as a frequency command designating the input driving frequency. A command processing unit is included in the processor to derive the voltage and frequency commands that matches with the dimmer demand so as to vary the light output of the lamp in accordance with the voltage command and the frequency command, respectively derived from the table.

12 Claims, 10 Drawing Sheets

US 6,954,038 B2

ELECTRONIC BALLAST FOR A DISCHARGE LAMP

TECHNICAL FIELD

The present invention relates to an electronic ballast for a discharge lamp, and more particularly to an electronic ballast enhanced with a microcomputer technology for optimum dimming control.

BACKGROUND ART

Japanese Patent Publication No. 6-76979 (published on Mar. 18, 1994) discloses an electronic ballast capable of dimming a discharge lamp. The ballast includes a DC voltage regulator providing a variable DC voltage and an inverter converting the DC voltage into a high frequency AC power which is applied through a resonance circuit to the discharge lamp. The DC voltage regulator is controlled by a voltage command to regulate or vary the DC voltage being applied to the inverter, while the inverter is controlled by a frequency command to vary the AC power being applied to the discharge lamp. The frequency command designates a frequency at which the inverter is driven to oscillate for generating the AC power. Also included in the ballast is a dimming controller which, in response to an external dimming signal, provides the voltage command as well as the frequency command for regulating the DC voltage output from the DC voltage regulator and the AC power output from the inverter for dimming the lamp. The dimming controller is configured to periodically change the frequency between two different values in order to operate the lamp stably in a low light output range. For this purpose, the ballast includes a frequency-switching unit which, in response to a monitored lamp current, instructs the dimming controller to change the frequency. Thus, the dimming control is made relying upon the lamp current being monitored. However, the dimming control may be insufficient for stably operating the lamp at different dimming levels due to a possible and transient fluctuation of the monitored lamp current. Thus, there is a demand for stably operating the lamp consistently at different dimming levels.

DISCLOSURE OF THE INVENTION

In view of the above insufficiency, the present invention has been achieved to provide an electronic ballast for a discharge lamp which is capable of operating the lamp stably at different dimming levels. The ballast of the present invention includes a DC voltage regulator providing a DC voltage that varies with a voltage command being fed to the DC voltage regulator, and an inverter converting the DC voltage into a high frequency AC power which is applied through a resonance circuit to the discharge lamp. The high frequency AC power is regulated to vary with a frequency command which designates a frequency at which the inverter is driven to oscillate. Included in the ballast is a dimming processor including a dimming unit that provides a dimming signal designating a varying dimming level for varying a light output of the discharge lamp in accordance with an external dimmer demand. The dimming processor includes a command processing unit which, in response to the dimming signal, generates the voltage command as well as the frequency command. The frequency command is composed of a first frequency and a second frequency which is a function of the first frequency and gives a resulting lamp voltage higher than that obtained at the first frequency. The command processing unit drives the inverter at the first and second frequencies alternately with respect to time to thereby regulate the high frequency AC power of the inverter.

The command processing unit is designed to include a memory for storing a first table that determines a predetermined relation between the dimmer signal and voltage command as well as the frequency command. It is from this memory that the command processing unit derives the voltage command as well as the frequency command that matches with the dimmer signal so that the command processing unit operates the DC voltage regulator and the inverter in accordance with the voltage command and the frequency command, respectively.

Thus, the first table in the memory can represent an optimum relation between the dimming level and the voltage command as well as the frequency command for the discharge lamp, thereby enabling the dimming control consistently and stably without being affected by a possible and transient variation in the lamp current or the like parameters.

Preferably, the command processing unit provides a first time frame and a second time frame in which the inverter operates at the first frequency and at the second frequency, respectively. The command processing unit generates the second frequency which becomes lower towards a middle of the second time frame than at the beginning and end of the second time frame. Thus, the second frequency can be given a waveform for increasing and decreasing the resulting AC voltage within the second time frame in an optimum manner for controlling the inverter effectively without posing undue stress to switching transistors forming the inverter. Further, such optimum waveform can be given with the inclusion of the memory in the ballast.

It is preferred that the first table has at least one point of inflection for a rate of voltage change of the voltage command and for a rate of frequency change of the frequency command with respect to the varying light output level. At least one point of inflection corresponds to a specific point with regard to the light output level, and defines a low light output range and a high light output range respectively below and above the specific point. The first table determines the rate of voltage change which is different for the low and high light output ranges, and the rate of frequency change which is also different for the low and high light output ranges. With this arrangement, the lamp can be successfully dimmed both in the low and high light output ranges where the lamp exhibits different lamp characteristics with regard to the voltage and the frequency changes.

The first table may be configured to make the rate of voltage change greater in one of the low and high light output ranges than in the other range when the rate of frequency change is smaller in the one of the low and high output ranges than in the other range.

Further, the first table may be configured to make at least one of the rate of voltage change and the rate of frequency change different for the low and high light output ranges such that a rate of change in the resulting light output of the lamp is smaller in the low light output range than in the high light output range.

Still further, the first table can be designed to have at least two points of inflection for the rate of voltage change and for the rate of the frequency change with respect to the varying light output level. The two points of inflection correspond to a first specific point and a second specific point with regard to the light output level, and define a low light output range below the first specific point, an intermediate light output range between the first and second specific points, and a high light output range above the second specific point. In this case, the first table is designed to make the rate of voltage change minimum in the intermediate light output range, and to make the rate of frequency change maximum in the intermediate light output range. With this control scheme, it is readily possible to dim or vary the light output smoothly over a wide range in consideration of the lamp characteristic.

Preferably, the memory includes, in addition to the first table, a second table which determines another predetermined relation between the dimmer signal and the voltage command as well as the frequency command, different from the relation given by the first table. In association with the first and second tables, a selector is included in the command processing unit to derive the voltage command and the frequency command from selective one of the first and second tables. In addition, the command processing unit includes a monitor which monitors a rate of change in the dimming level intended by the dimming signal and which provides a first signal when the rate of change in the dimming level is smaller than a predetermined rate and otherwise provides a second signal. The first signal actuating the selector to derive the voltage command and the frequency command from the first table, while the second signal actuating the selector to derive the voltage command and the frequency command from the second table. Thus, the dimming control of the lamp can be made differently depending upon whether the lamp is intended to vary its light output quickly or slowly, thereby enabling to vary the light output in a manner natural to the human perception. For example, when the lamp is intended to increase its light output quickly from minimum to maximum, one of the tables is selected to give a quick control not leaving a time lag in reaching the maximum light output level.

In a preferred embodiment, the command processing unit includes a voltage signal generator that generates the voltage command, a first frequency signal generator that generates a first frequency command designating the first frequency, a second frequency signal generator that generates a second frequency command designating the second frequency, and a selector providing selective one of the first and second frequency commands to the inverter. The voltage signal generator is in the form of a pulse-width-modulator that gives a PWM signal of which width defines the voltage command. The voltage signal generator produces a timing pulse in synchronize with the PWM signal and provides the timing pulse to the second frequency signal generator. Each time upon receiving the timing pulse, the second frequency signal generator responds to generate the second frequency command as well as a predetermined time frame. The selector is connected to receive the first frequency command, the second frequency command, and the time frame so that it passes the second frequency command to the inverter only during the time frame and otherwise pass the first frequency command to be issued to the inverter. With this arrangement, the voltage signal generator is best utilized to determine the time frame for passing the second frequency command without relying upon an additional circuit component specifically designed to determine the timing of changing the first and second frequency commands.

The command processing unit may include one or more smoothing circuits which smooth out at least one of the first frequency command, the dimming signal, the voltage command, and the frequency command for avoiding a possible abrupt error that may occur in the control of the discharge lamp.

The smoothing circuits may be configured to have adjustable time constants which determine individual response times by which the voltage command and the frequency command are delayed in driving the DC voltage regulator and the inverter, respectively. A dimming direction monitor is included in the command processing unit to provide an upward signal when the dimming signal indicates an increase in the light output level and provide a downward signal when the dimming signal indicates a decrease in the light output level. The dimming direction monitor adjusts the time constants of the smoothing circuits in order to make the response time of the voltage command longer than that of the frequency command in response to the upward signal, and to make the response time of the frequency command longer than that of the voltage command in response to the downward signal. Thus, it is possible to vary the light output of the lamp smoothly and naturally with different delays, i.e., in an optimum fashion natural to the human perception depending upon the direction in which the lamp is intended to vary the light output.

The frequency command is realized by a digital signal to be converted by a D/A converter into an analog signal which is fed to a voltage controlled oscillator. The voltage controlled oscillator is provided in the ballast to receive the analog signal and drive the inverter at the frequency designated by the frequency command. The D/A converter is preferably defined by a ladder resistor network or weighted resistor network.

These and still other objects and advantageous features of the present invention will become more apparent from the following detailed description of the embodiments when taken in conjunction with the attached drawings.

BEST MODE FOR CARRYING OUT THE INVENTION

Figure 1:
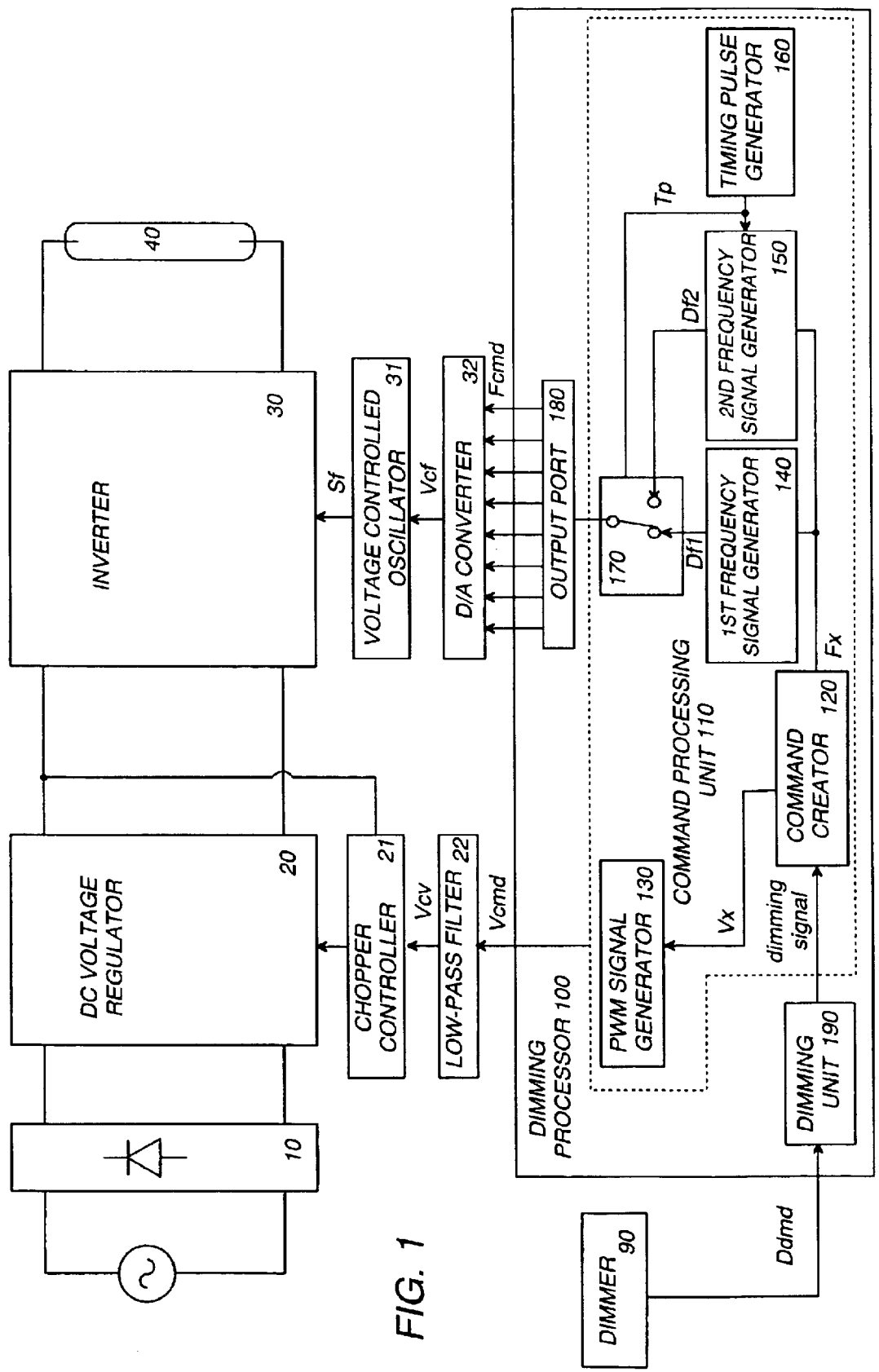
FIG. 1 is a block circuit diagram of an electronic ballast for a discharge lamp in accordance with a first embodiment of the present invention.

Referring now to FIG. 1, there is shown an electronic ballast for a discharge lamp in accordance with a first embodiment of the present invention. The ballast is designed for dimming the lamp, i.e., adjusting the light output of the lamp, and includes a rectifier 10 providing a rectified DC voltage from an AC voltage source, a DC voltage regulator 20 providing a regulated DC voltage, and an inverter 30 powered by the output of the DC voltage regulator 20 to supply a high frequency AC power to the discharge lamp 40. The inverter 30 includes a resonant circuit through which the high frequency AC power is supplied to the discharge lamp 40.

The DC voltage regulator 20 is in the form of a conventional chopper having an inductor and a switching element which is driven to turn on and off repetitively to store an energy in the inductor while the switching element is on and release the energy, i.e., the DC voltage while the switching element is off, thereby regulating the output DC voltage. A chopper controller 21 is included to control the DC voltage regulator 20 in accordance with a voltage command Vcmd supplied from a dimming processor 100. The voltage command Vcmd is a digital signal which is smoothed through the low-pass filter 22 into a voltage signal Vcv input to the chopper controller 21 which drives the DC voltage regulator to provide the DC voltage determined by the pulse-width of the voltage signal Vcv. In addition, the chopper controller 21 monitors the output DC voltage in order to keep the output DC voltage in a feedback manner at a level intended by the voltage signal Vcv.

The inverter 30 is of a conventional design having switching transistors which are driven to turn on and off at a high frequency to convert the output DC voltage into the high frequency AC power being supplied through the resonant circuit to operate the discharge lamp 40. The inverter 30 is controlled by a voltage controlled oscillator 31 which gives, in accordance with a frequency command Fcmd from the dimming processor 100, a varying frequency signal Sf at which the switching transistors are turned on and off. The frequency command Fcmd is a digital signal which is converted through a D/A converter 32 into a corresponding voltage signal Vcf input to the voltage controlled oscillator 31. The inverter 30 is designed to have a driving frequency which is variable within a range not lower than a resonant frequency $f_0$ of the resonant circuit in order to reduce the lamp voltage as the frequency increases.

The dimming processor 100 is realized by a microprocessor unit (MPU) which processes an external dimmer demand Ddmd from a dimmer 90 to generate the voltage command Vcmd and the frequency command Fcmd for dimming, i.e., adjusting the light output of the discharge lamp 40 as intended by the external dimmer demand Ddmd. The dimming processor 100 includes a dimming unit 190 that converts the external dimmer demand Ddmd of an analog signal into a corresponding digital dimming signal, and a command processing unit 110 that generates the voltage command Vcmd and the frequency command Fcmd based upon the dimming signal from the dimming unit 190. The command processing unit 110 includes a command creator 120 that provides a voltage index Vx and a frequency index Fx, a PWM signal generator 130 that generates the voltage command Vcmd in correspondence to the voltage index Vx. The voltage command Vcmd is a pulse modulated signal of which pulse-width is proportional to the light output of the discharge lamp intended by the dimming signal.

The terms "voltage command Vcmd" and "voltage index Vx" are introduced in the description for the purpose of explaining the operation of the ballast in exact coincidence with the illustrated circuit configuration. However, as will be clear from the following description, the term "voltage command Vcmd" has a direct relation to the term "voltage index Vx", and therefore these terms have equal weights in defining the scope of the present invention. Only for the sake of conciseness, the claims and some parts of the description recite "the voltage command" as representative of "the voltage index". This applies also to the relation between the terms "frequency command Fcmd" and "frequency index Fx".

Also included in the command processing unit 110 are a first frequency signal generator 140 that generates a first frequency command Df1 in correspondence to the frequency index Fx, and a second frequency signal generator 150 that generates a second frequency command Df2 also in correspondence to the frequency index Fx. The first frequency command Df1 designates a first frequency for driving the inverter, while the second frequency command Df2 designates a second frequency which is a function of the first frequency to give a resulting lamp voltage higher than that obtained at the first frequency.

Figure 2:
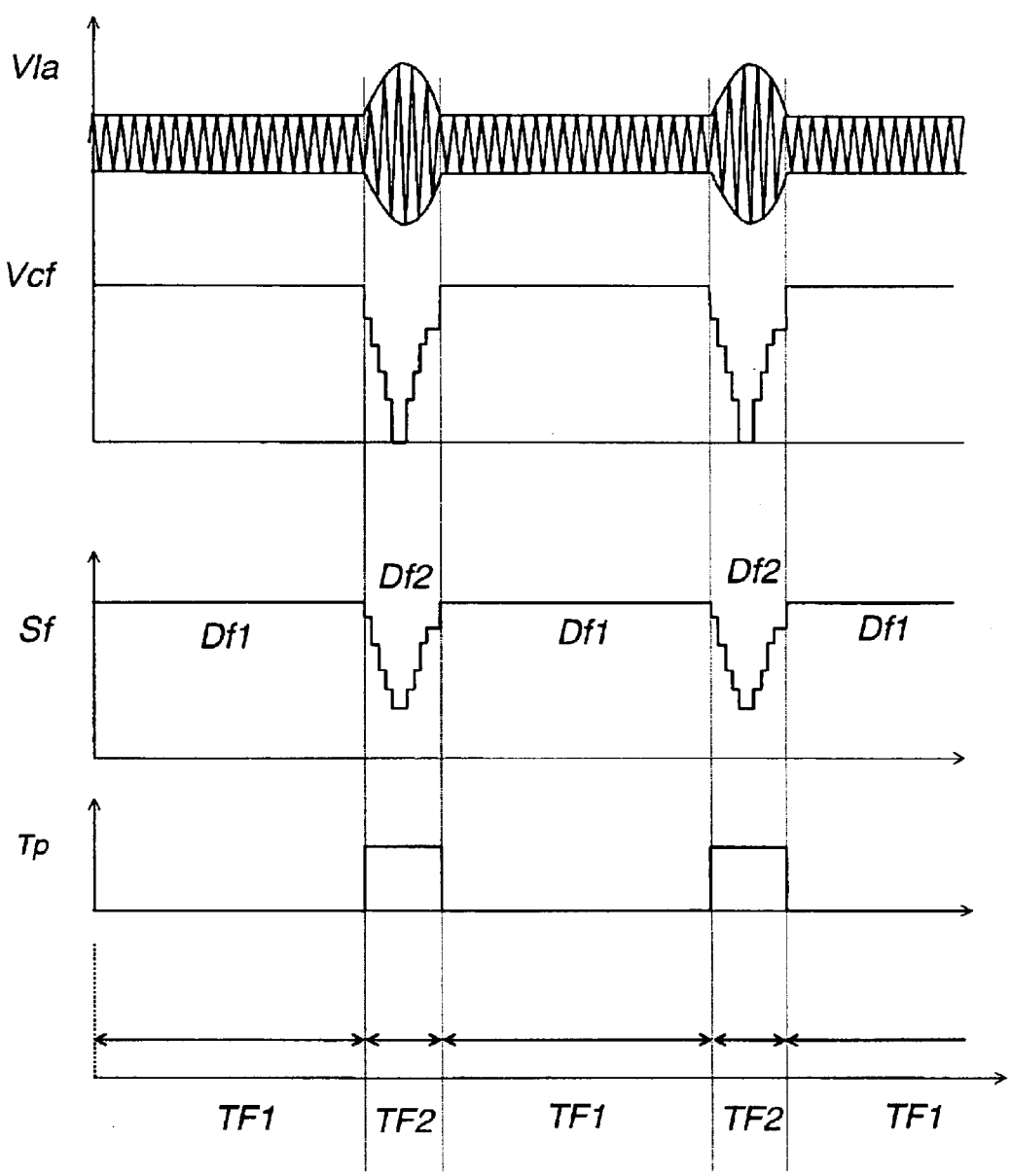
FIG. 2 is a waveform chart illustrating the operation of the ballast.

The first and second frequency commands Df1 and Df2 are alternately supplied through a switch 170 and an output port 180 as the frequency command Fcmd to the D/A converter 32. For this purpose, the command processing unit 110 further includes a timing pulse generator 160 that determines a timing of changing over the first and second frequency commands, as shown in FIG. 2, in order to vary the driving frequency of the inverter 30 cyclically between those designated by the first and second frequency commands at the intended light output of the discharge lamp. That is, the timing pulse generator 160 generates a timing pulse Tp for a predetermined duration regularly, as shown in FIG. 2, so that the switch 170 acts to pass the first frequency command Df1 only in the absence of the timing pulse Tp and to pass the second frequency command Df2 only in the presence of the timing pulse Tp. In other words, the timing pulse generator 160 defines a first time frame TF1 in which the inverter 30 is driven to oscillate in response to the first frequency command Df1 and a second time frame TF2 in which the inverter 30 is driven to oscillate in response to the second frequency command Df2. Thus, the inverter 30 is driven to oscillate basically at two alternate frequencies for cyclically varying the lamp voltage Vla in order to keep the lamp operated without causing undesired extinction even at the low light output of the discharge lamp. In detail, the second frequency command Df2 designates a varying frequency which becomes lower towards a middle of the second time frame TF2 than at the begging and the end of the second time frame TF2 in such a pattern as not to cause undue stress applied to the switching elements of the inverter 30.

Figures 3, 4A, 4B:
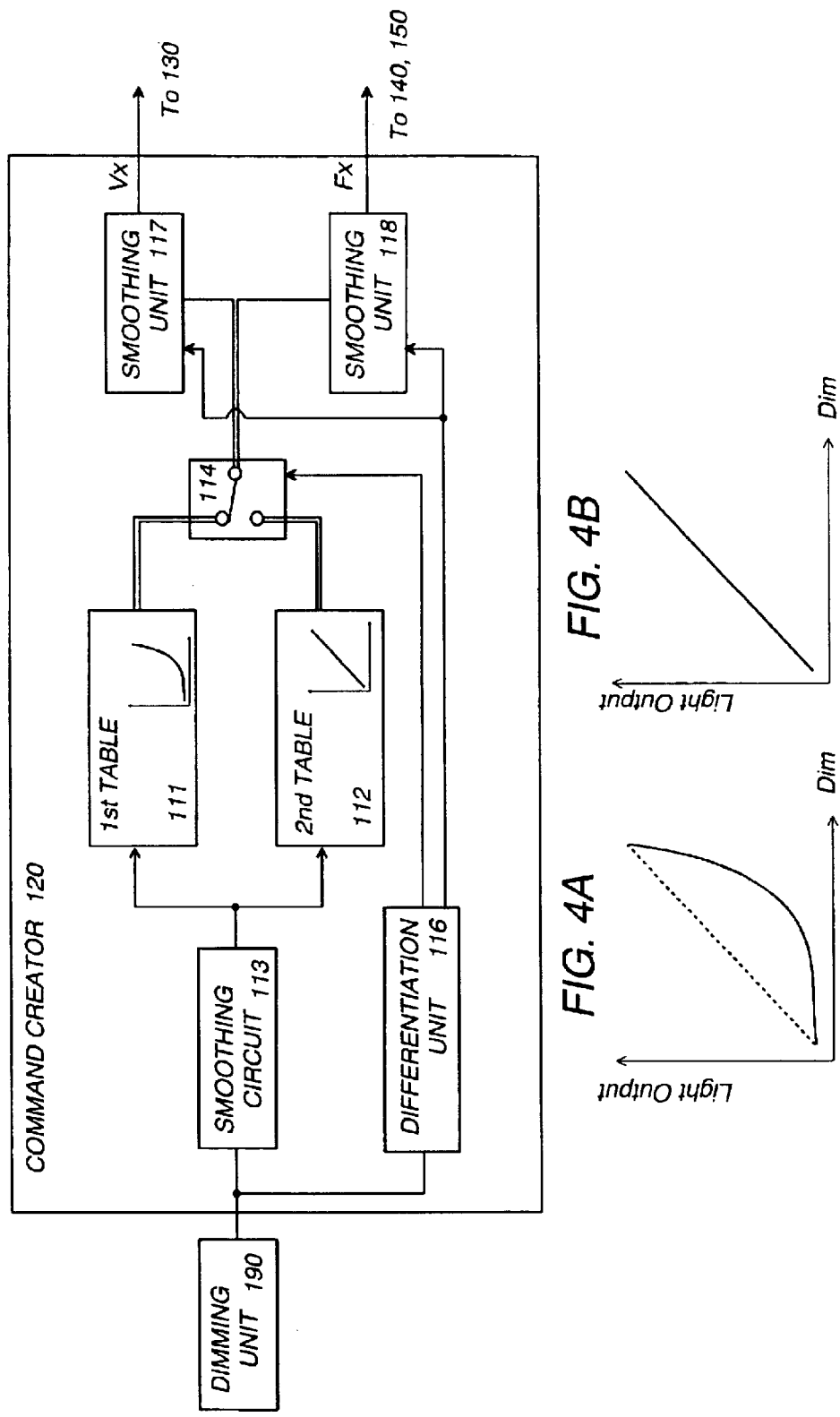
FIG. 3 is a block diagram illustrating a portion of the ballast.
FIGS. 4A and 4B are graphs respectively illustrating a varying light output of the lamp as a function of a dimming signal.

As shown in FIG. 3, the command creator 120 has a memory which stores a first table 111 and a second table 112 each determining a predetermined relation between the dimming signal and the voltage command Vcmd as well as the frequency command Fcmd for providing the voltage index Vx to the PWM signal generator 130 and the frequency index Fx to the first and second frequency signal generators 140 and 150. The first and second tables 111 and 112 are provided to be relied selectively upon in accordance with how fast the light output is intended to vary. When the light output is intended to vary moderately, the first table 111 is relied upon to give the relation, as shown in FIG. 4A, where the resulting light output follows the dimming ratio Dim with some delay in response in order to vary the light output natural to the human eyes. While on the other hand, when the light output is intended to vary quickly, the second table 112 is relied upon to give the relation, as shown in FIG. 4B, where the resulting light output follows the dimming ratio Dim straight in order to vary the light output quickly without causing a response delay in the human perception. For this purpose, the command creator 120 includes a differential unit 116 which calculates a differentiated value of the dimming signal from the dimming unit 190 and causes a selector 114 to derive the voltage index Vx and the frequency index Fx from the first table 111 in correspondence to the dimming ratio Dim when the differentiated value is lower than a predetermined level, and otherwise derives the voltage index Vx and the frequency index Fx from the second table 112. The selection of the first table 111 and the second table 112 may be made based upon another parameter indicative of a rate of the changing the light output of the lamp. It is noted here that the dimming ratio Dim is utilized in the description to denote an intended light output that increases with the increased dimming ratio.

Figure 5A:
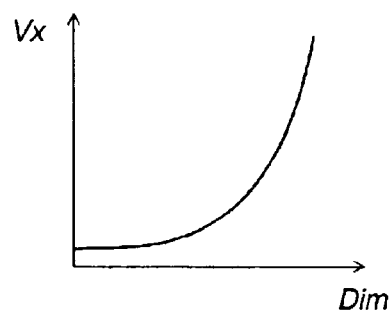
FIGS. 5A and 5B are graphs illustrating a voltage index Vx and a frequency index Fx varying in accordance with the dimming signal (Dim)
Figure 5B:
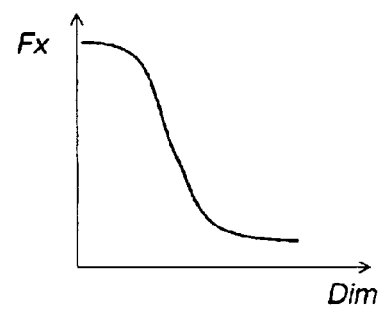
Figure 6A:
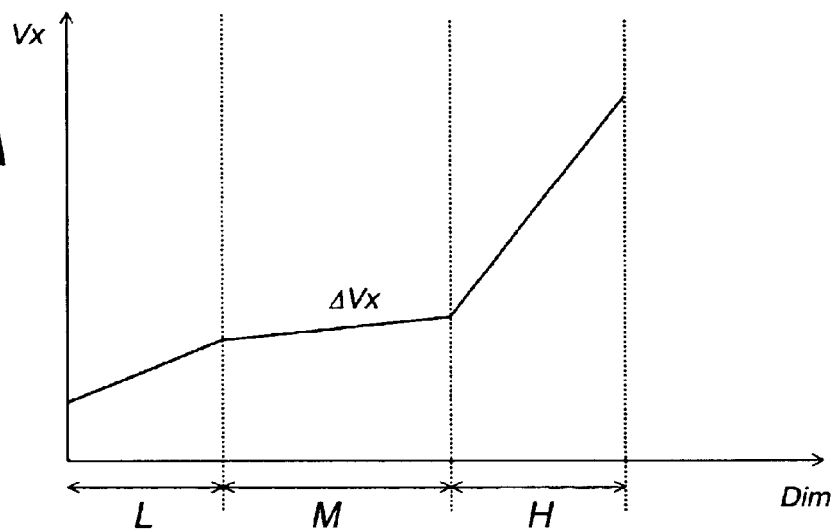
FIGS. 6A and 6B are graphs illustrating a dimming control scheme stored in a first table with regard to the voltage index Vx and the frequency index Fx that vary in different manners in different light output ranges, respectively.
Figure 6B:
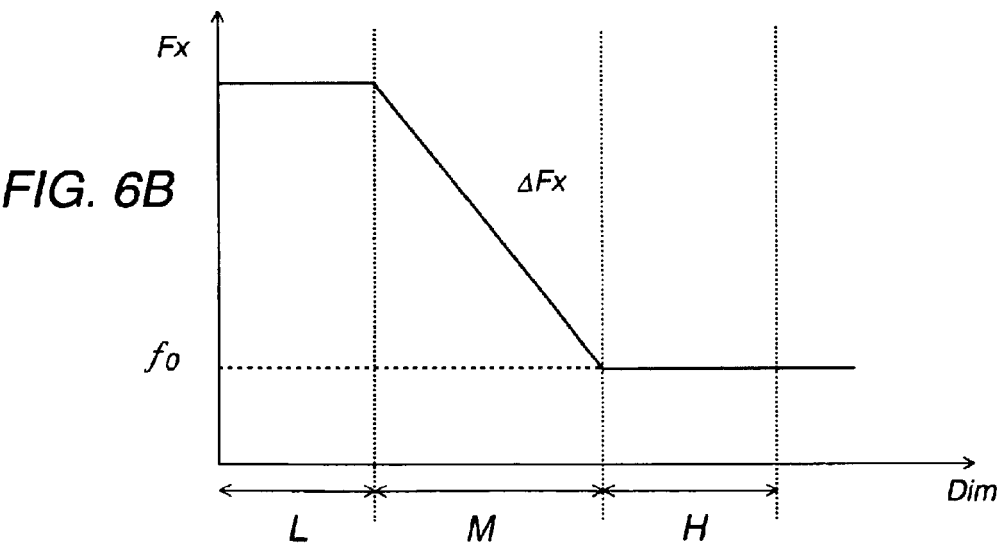
Figure 7A:
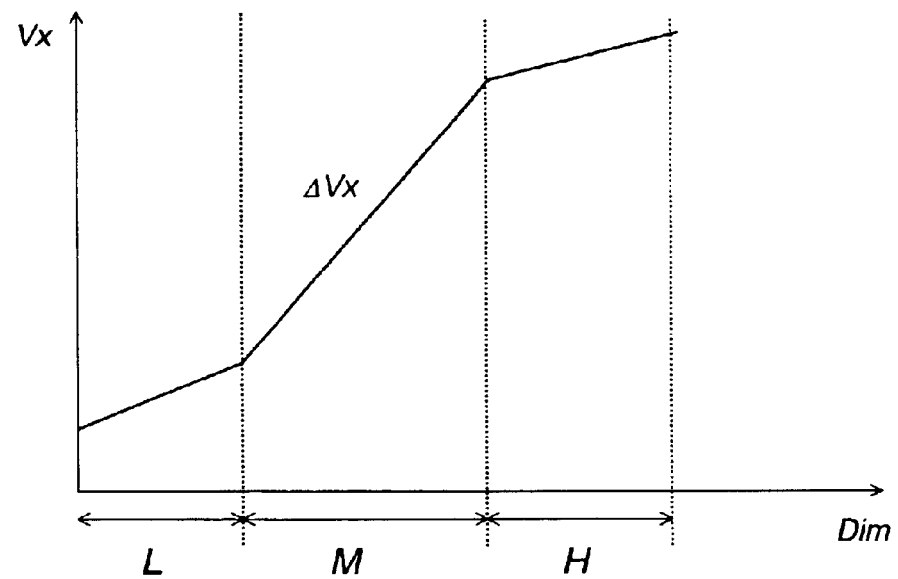
FIGS. 7A and 7B are graphs illustrating a dimming control scheme stored in a second table with regard to the voltage index Vx and the frequency index Fx that vary in different manners in different light output ranges, respectively.
Figure 7B:
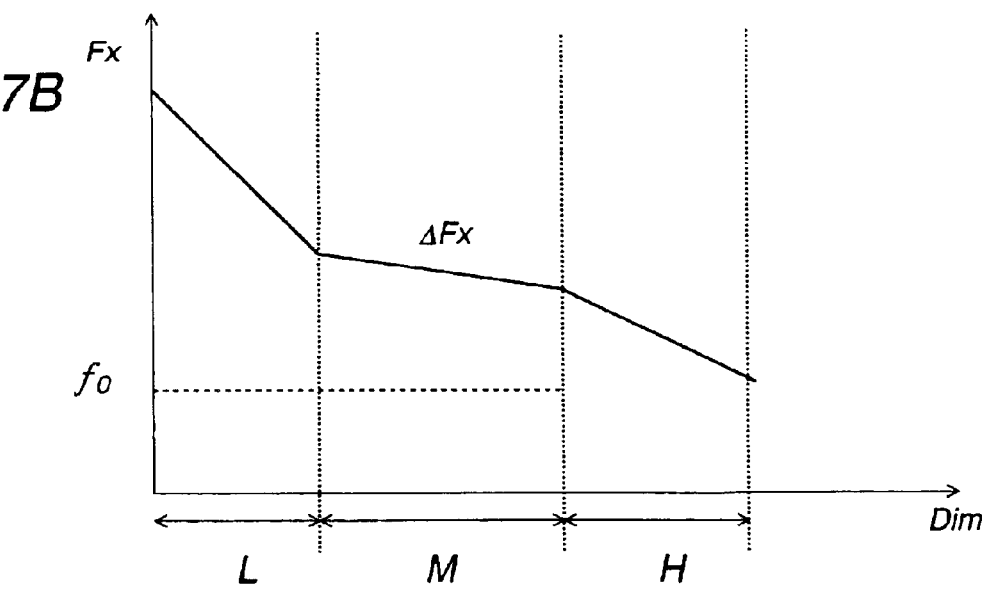

Further, the command creator 120 includes a smoothing circuit 113 that smoothes out the dimming signal to remove any unintended abrupt fluctuation or error noise from the dimming signal being fed from the dimming unit 190 to the first and second tables 111 and 112. Like smoothing circuits 117 and 118 are provided for smoothing out the voltage index Vx and the frequency index Fx being fed to the PWM signal generator 130 and the first and second frequency signal generators 140 and 150, respectively. Additional smoothing circuits 117 and 118 are provided to smooth out the voltage index Vx and the frequency index Fx, respectively The first table 111 defines a characteristic curve of the voltage index Vx, i.e. the voltage command Vcmd that increases generally in a quadric manner as the dimming ratio Dim increases, i.e., the dimming signal gives the increasing light output, as shown in FIG. 5A, and a characteristic curve of the frequency index Fx, i.e., the frequency command Fcmd that decreases generally in a quadric fashion as the dimming ratio Dim increases, as shown in FIG. 5B. These curves are combined to represent the relation of FIG. 4A. In detail, as shown in FIGS. 6A and 6B, the first table 111 defines the characteristic curve of the voltage index Vx, that has two inflection points for a rate of voltage change of the voltage index Vx as well as for a rate of frequency change of the frequency index Fx. These two inflection points are set to correspond respectively to first and second specific points with regard to the dimming ratio Dim, and define a low light output range L below the first point, an intermediate light output range M between the first and second specific points, and a high light output range H above the second specific point. The first table 111 gives the rate of voltage change ΔVx which is minimum in the intermediate light output range M, while giving the rate of frequency change ΔFx which is maximum in the intermediate light output range M. Thus, it is easy to vary the light output of the discharge lamp optimally in the different light output ranges for achieving consistent dimming control over a wide range of the light output. On the other hand, the second table 112 gives, as shown in FIGS. 7A and 7B, the rate of voltage change ΔVx which is maximum in the intermediate light output range M, while giving the rate of frequency change ΔFx which is minimum in the intermediate light output range M, making it easy to achieve a consistent dimming control over the wide range also with the second table 112.

Figure 8A:
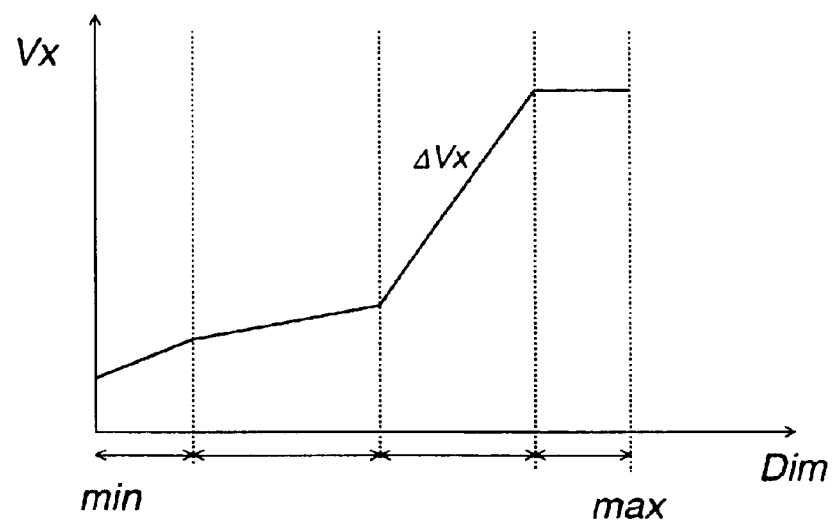
FIGS. 8A and 8B are graphs illustrating another dimming control available in the ballast.
Figure 8B:
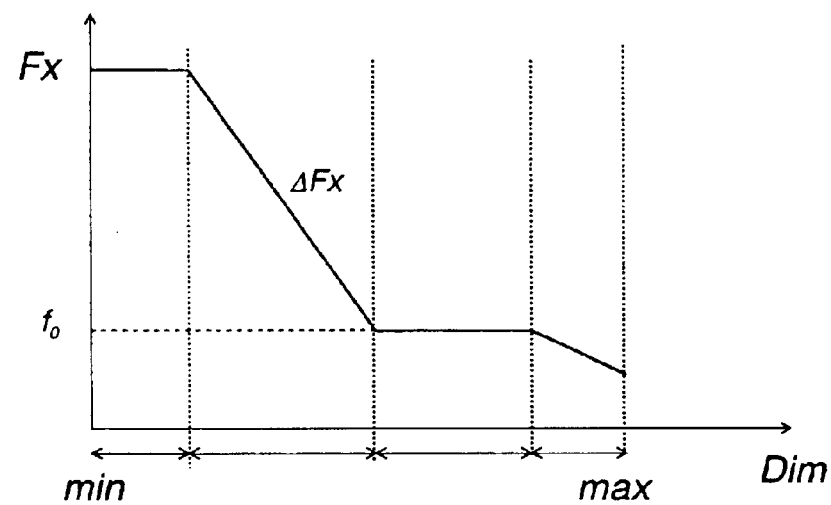

The first table 111 or the second table 112 may be designed to define the characteristic curves of the voltage index Vx as well as the frequency index Fx both having three inflection points, as shown in FIGS. 8A and 8B, for giving the rates of voltage and frequency changes that differ from regions to regions over substantially the entire range of the light output of the discharge lamp from the minimum to the maximum of the dimming ratio Dim.

Figure 9:
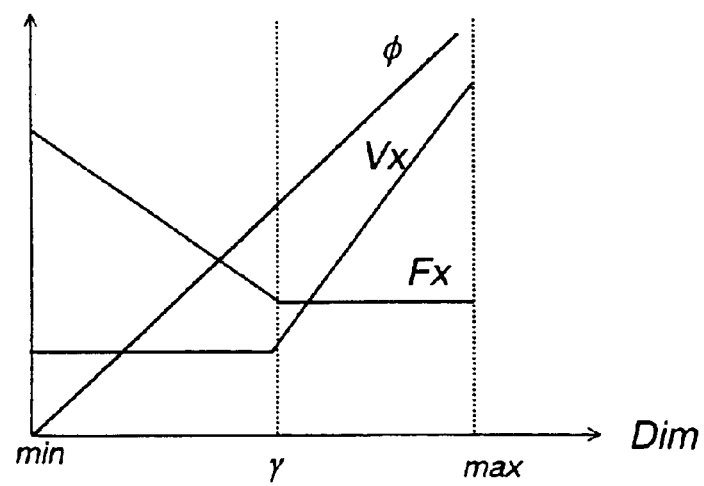
FIG. 9 is a graph illustrating a simplified dimming control available in the ballast with regard to a relation between the light output ($\phi$), the voltage index Vx, and the frequency index Fx.
Figure 10:
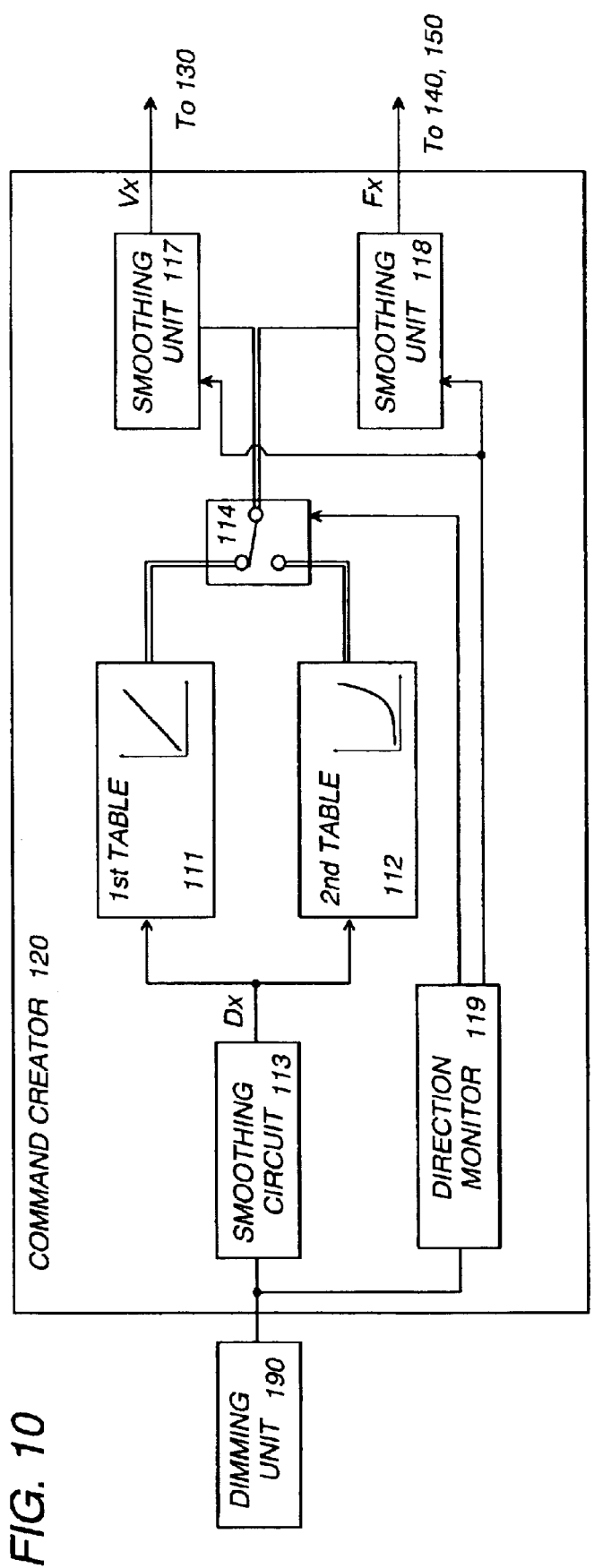
FIG. 10 is a block diagram of a portion of the ballast in accordance with a modification of the above embodiment.

Further, the first table 111 or the second table 112 may be simplified to define the characteristic curves of the voltage index Vx as well as the frequency index Fx each having only one inflection point that corresponds to a middle level γ of the light output, as shown in FIG. 9. In this instance, the voltage index Vx, i.e., the voltage command Vcmd is kept constant within a low light output region between the minimum and the middle level γ, and increases with the dimming ratio Dim increasing past the middle level γ to the maximum, while the frequency command Fx decreases with the dimming ratio Dim decreasing from the minimum to the middle level γ, and is kept constant within a high output region above the middle level γ. It is noted in this connection that the first and second tables are configured to differentiate at least one of the rate of the voltage index, the rate of the frequency index, and the middle level γ. As shown in FIG. 10, the command creator 120 having thus configured first and second tables 111 and 112 has a direction monitor 119 that processes the dimming signal from the dimming unit 190 to obtain the direction of varying the light output for differentiate the dimming control depending upon the monitored direction, realizing to vary the light output in consistent with the human eye's perception. The direction monitor 119 provides an upward signal and a downward signal when the dimming ratio Dim increases and decreases, respectively. Depending upon the monitored direction, one of the smoothing circuit 117 for the voltage index Vx and the smoothing circuit 118 for the frequency index Fx is controlled to delay in providing the corresponding one of the indexes from the other. For this purpose, the smoothing circuits 117 and 118 have adjustable time constants that determine individual response times by which the voltage index Vx and the frequency index Fx are delayed in driving the DC voltage regulator 20 and the inverter 30.

Figure 11:
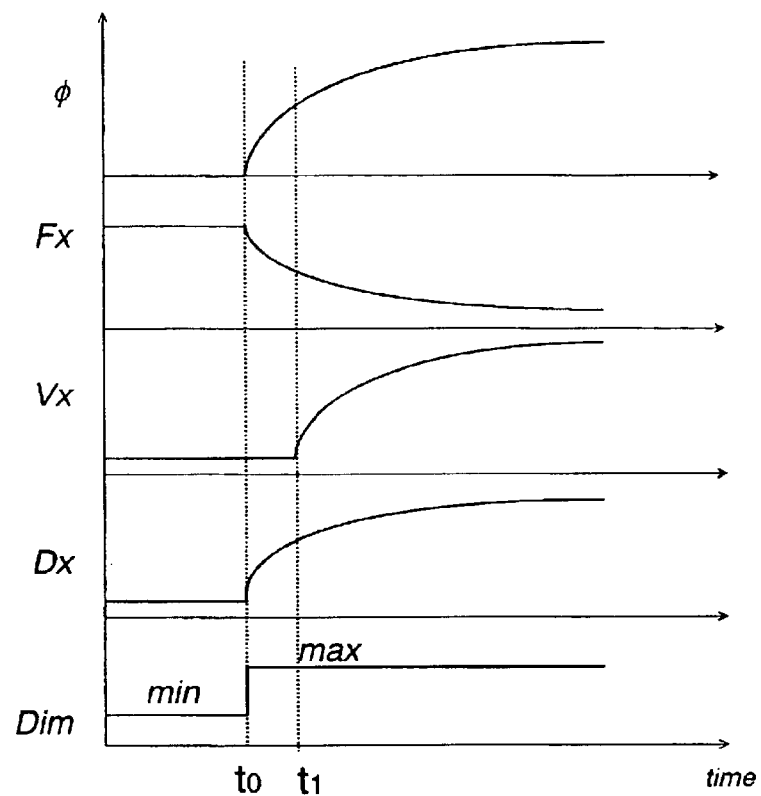
FIG. 11 is a waveform chart illustrating the dimming control in a direction of increasing the light output ($\phi$)
Figure 12:
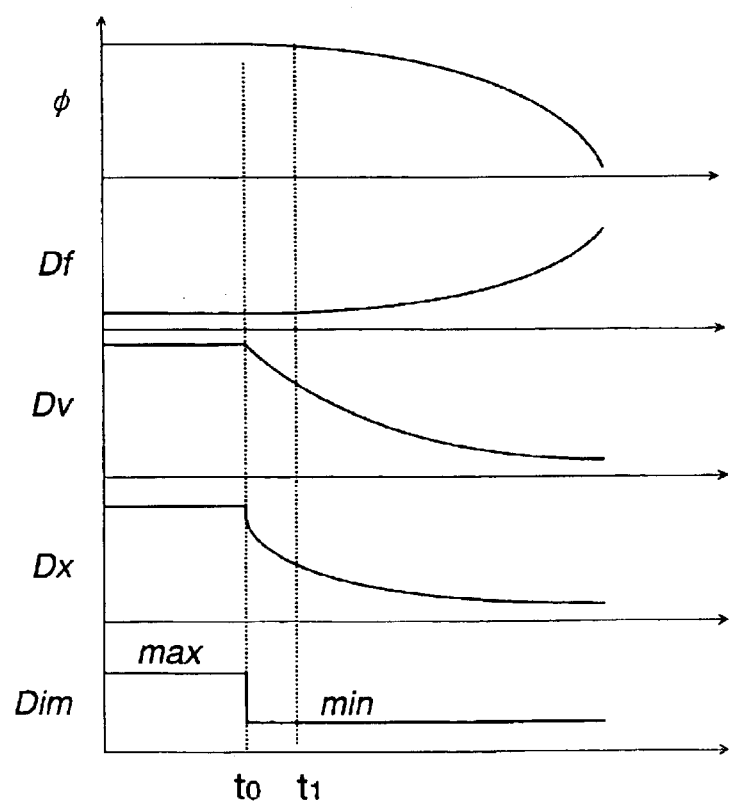
FIG. 12 is a waveform chart illustrating the dimming control in a direction of decreasing the light output (φ)

For example, as shown in FIG. 11, when the dimming ratio Dim is intended to increase from minimum to maximum at time t0, the smoothing circuit 117 is controlled by the upward signal to increase the time constant by a greater extent than the smoothing circuit 118, in order to delay in increasing the voltage index Vx than the frequency index FX that starts decreasing at time t0, and to start increasing the voltage index at time t1. When, on the other hand, the dimming ratio Dim is intended to decrease from maximum to minimum at time t0, the smoothing circuit 118 is controlled by the downward signal to increase the time constant by a greater extent than the smoothing circuit 117, as shown in FIG. 12. Consequently, the frequency index Fx is delayed in increasing while the voltage index Vx starts decreasing immediately at time t0, and the frequency index Fx starts increasing only after time t1. With this result, the resulting light output responds to vary with some delay in consistent with and natural to the human eye's perception.

Figure 13:
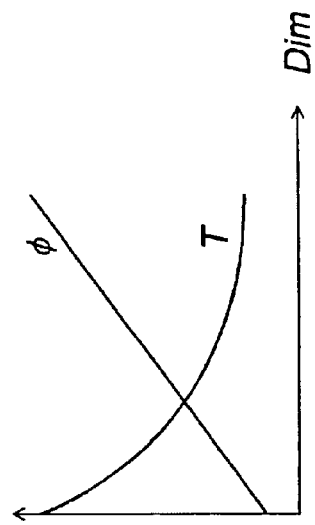
FIG. 13 is a graph illustrating a relation between the light output (φ) and a time constant (T) of a particular smoothing circuit included in the ballast.

Also for making the consistent dimming control natural to the human eyes, the smoothing circuit 113 just behind of the dimming unit 190 is configured to decrease the time constant T with the increasing dimming ratio, as shown in FIG. 13, to provide the modified dimming signal Dx in order to delay providing the voltage index Vx and the frequency index Fx by a greater extent as the dimming ratio Dim decreases, i.e., at the time of varying the light output in the lower light output range than at the high light output range.

Although the present embodiment is explained to selectively use the first and second tables, it is equally possible to rely on a single table corresponding to either of the first and second table, or even to provide or more like tables for selecting one of the tables in accordance with the intended rate or direction of varying the light output of the discharge lamp.

Turning back to FIG. 1, the D/A converter 32, which converts the frequency command Fcmd into the analog signal Vcf, is made of a ladder resistor network or weighted resistor network. Instead of using the combination of the voltage controlled oscillator 31 and the D/A converter 32, it is equally possible to provide a suitable oscillator that determines the driving frequency directly from the frequency command Fcmd to drive the inverter at thus determined driving frequency.

Figure 14:
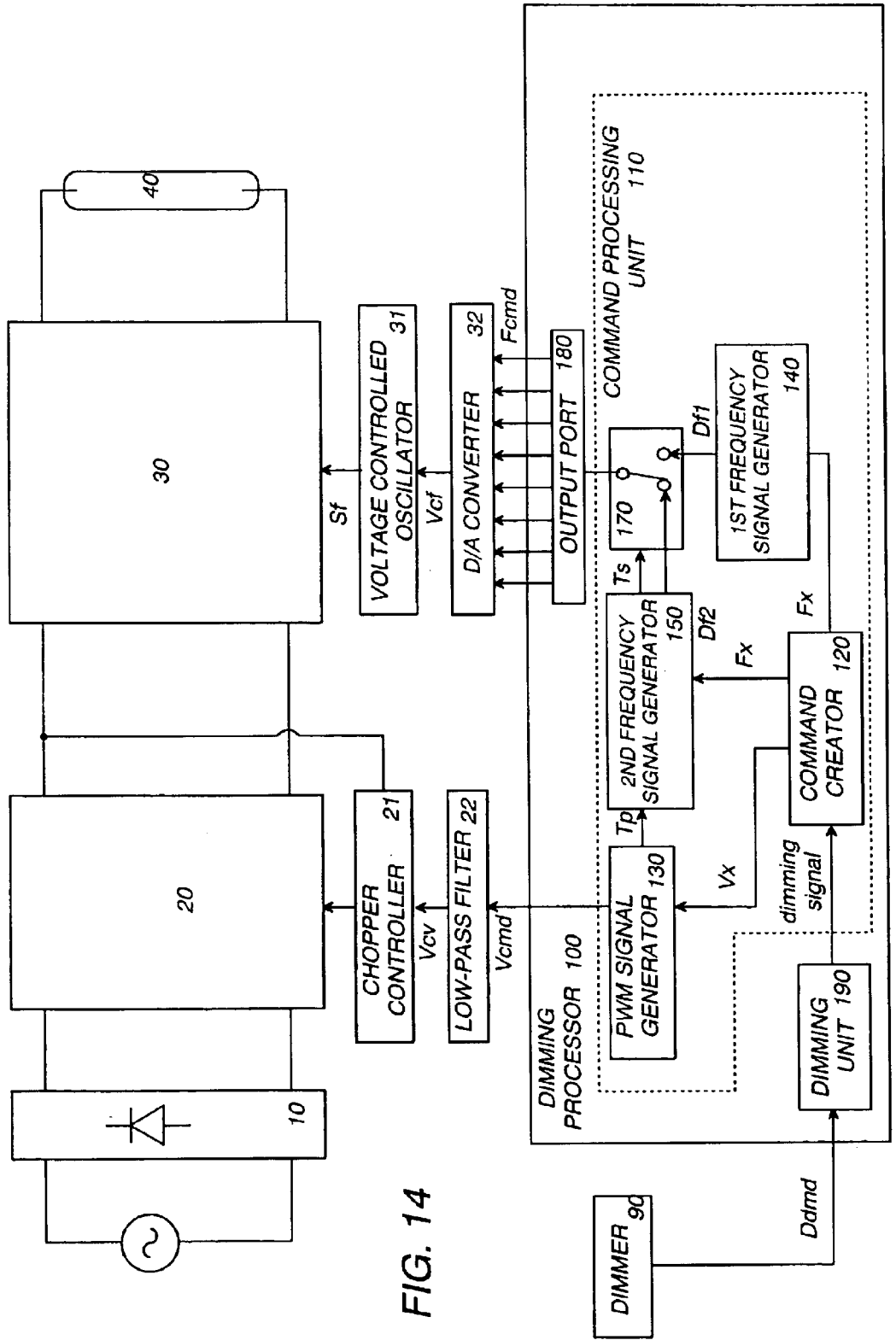
FIG. 14 is a block circuit diagram of an electronic ballast for a discharge lamp in accordance with a second embodiment of the present invention.
Figure 15:
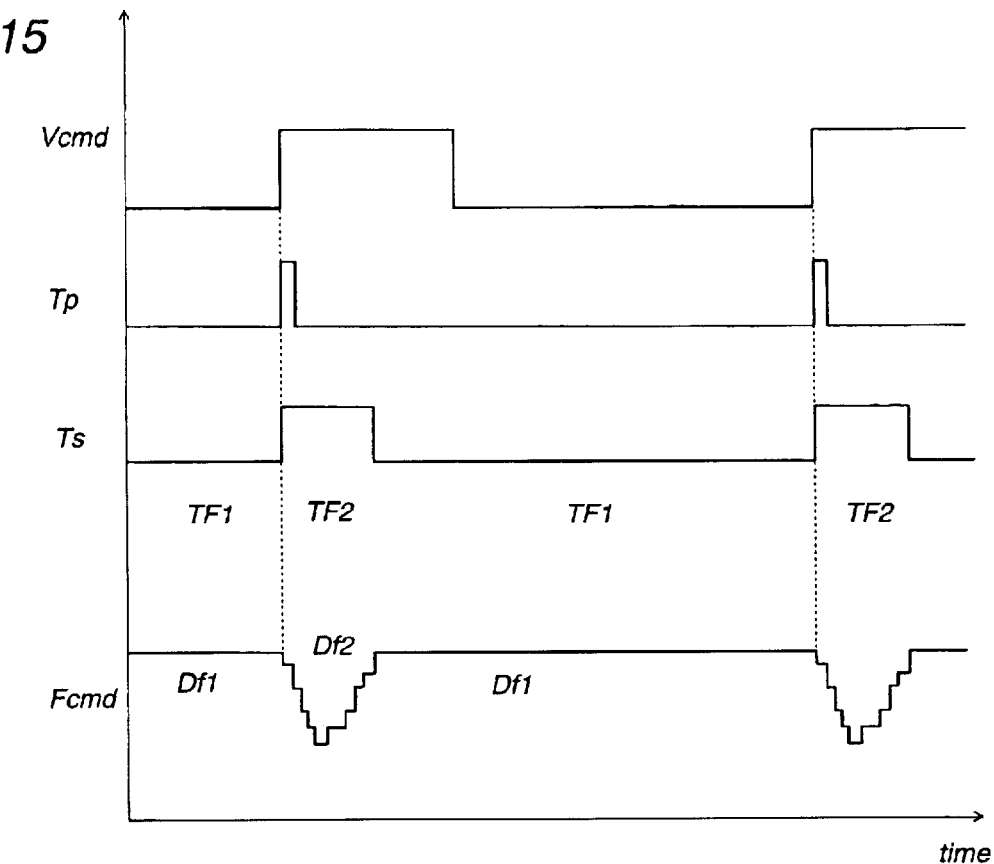
FIG. 15 is a waveform chart illustrating the operation of the ballast.

Referring to FIGS. 14 and 15, there is shown an electronic ballast in accordance with a second embodiment of the present invention which is identical to the first embodiment except that the PWM signal generator 130 is best utilized to give the timing pulse Tp for changing over the first and second frequency commands Df1 and Df2, eliminating the necessity of providing the separate timing pulse generator 160 as utilized in the first embodiment. The other structures and operations are identical, therefore no duplicate explanation are made here.

As shown in FIG. 15, each time the PWM signal generator 130 generates the voltage command Vcmd, it provides the timing pulse Tp that is fed to the second frequency signal generator 150 which responds to issue a switching pulse Ts having a predetermined pulse width, in addition to the second frequency command Df2. The switching pulse Ts activates the switch 170 to pass the second frequency command Df2 to the output port 180 within the pulse width of the switching pulse Ts, thereby driving the inverter 30 at the frequency designated by the second frequency command Df2. In the absence of the switching pulse Ts, the switch 170 is caused to pass the first frequency command Df1 from the first frequency signal generator 140 to the output port 180 in the absence of the switching pulse Ts. Thus, the second frequency signal generator 150 determines, in response to the timing pulse Tp from the PWM signal generator 130, the first and second time frames TF1 and TF2 which repeat alternately for driving the inverter 30 cyclically at the different frequencies defined respectively by the first and second frequency commands Df1 and Df2, as shown in FIG. 15.

Figure 16A:
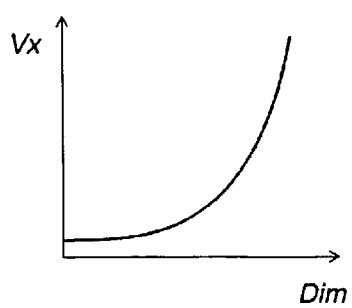
FIGS. 16A and 16B are graphs illustrating a correlation between the voltage index Vx and the frequency index Fx that may be utilized in the ballast of the present invention.
Figure 16B:
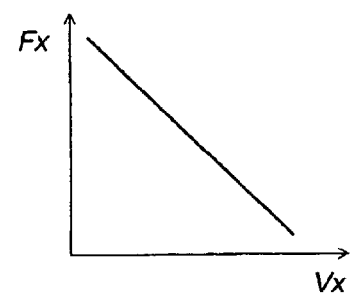

In the above illustrated embodiments, it is explained that the command creator 120 provides the voltage index Vx and the frequency index Fx separately based upon the dimming signal from the dimming unit 190, i.e., each of the tables stores the voltage index Vx and the frequency index Fx defined separately for different dimming ratios. However, it is equally possible to correlate the voltage index Vx with the frequency index Fx, as shown in FIGS. 16A and 16B. That is, the voltage index Vx is defined as a function of the dimming ratio Dim, and the frequency index Fx is defined as a function of the voltage index Vx. Thus, the structure of the table can be simplified to store only the voltage index Vx, with an addition of a simple multiplier in the command creator 120 that multiplies the voltage index Vx by a proper value to give the correlated frequency index Fx.

It is noted that the present invention should not be limited to the features disclosed as specific to the individual embodiments and modifications, and should encompass any combination of the individual features. This application is based upon and claims the priority of Japanese Patent Application No. 2002-154804, filed in Japan on May 28, 2002, the entire contents of which are expressly incorporated by reference herein.

What is claimed is:

1. An electronic ballast for a discharge lamp comprising:
a DC voltage regulator providing a DC voltage that varies with a voltage command being fed to said DC voltage regulator,
an inverter converting said DC voltage into a high frequency AC power which is applied through a resonance circuit to said discharge lamp, said high frequency AC power being regulated to vary with a frequency command which designates a frequency at which said inverter is driven to oscillate;
a dimming processor including a dimming unit that provides a dimming signal designating a varying dimming level for varying a light output of said discharge lamp in accordance with an external dimmer demand,
wherein said dimming processor includes a command processing unit which, in response to the dimming signal, generates said voltage command and said frequency command, said frequency command designating a first frequency and a second frequency which is a function of said first frequency and gives a resulting lamp voltage higher than that obtained at said first frequency, said command processing unit driving said inverter at said first and second frequencies alternately with respect to time to thereby regulate said high frequency AC power of said inverter,
said command processing unit including a memory for storing a first table that determines a predetermined relation between the dimming signal and voltage command as well as said frequency command, said command processing unit deriving from said memory said voltage command as well as said frequency command that matches with the dimming signal, and operating said DC voltage regulator and said inverter in accordance with said voltage command and said frequency command, respectively.

2. The electronic ballast as set forth in claim 1, wherein said command processing unit provides a first time frame in which said inverter operates at said first frequency and a second time frame in which said inverter operates at said second frequency,
said command processing unit generating said second frequency which becomes lower towards a middle of said second time frame than at the beginning and end of said second time frame.

3. The electronic ballast as set forth in claim 1, wherein said first table has at least one point of inflection for a rate of voltage change of said voltage command and for a rate of frequency change of said frequency command with respect to the varying light output level,
said at least one point of inflection corresponding to a specific point with regard to the light output level, and defining a low light output range and a high light output range respectively below and above said specific point, and said first table determining said rate of voltage change which is different for said low and high light output ranges, and determining said rate of frequency change which is different for said low and high light output ranges.

4. The electronic ballast as set forth in claim 3, wherein said first table determines that the rate of voltage change is greater in one of said low and high light output ranges than in the other when the rate of frequency change is smaller in said one of said low and high output ranges than in the other.

5. The electronic ballast as set forth in claim 1, wherein said first table has at least one point of inflection for at least one of a rate of voltage change of said voltage command and of a rate of frequency change of said frequency command with respect to the varying light output level, said at least one point of inflection corresponding to a specific point with regard to the light output level, and defining a low light output range and a high light output range respectively below and above said specific point, and said first table determining at least one of said rate of voltage change and said rate of frequency change is different for said low and high light output ranges such that a rate of change in the resulting light output of said discharge lamp is smaller in said low light output range than in said high light output range.

6. The electronic ballast as set forth in claim 1, wherein said first table has at least two points of inflection for a rate of voltage change of said voltage command and for a rate of frequency change of said frequency command with respect to the varying light output level, said two points of inflection corresponding to a first specific point and a second specific point with regard to the light output level, and defining a low light output range below the first specific point, an intermediate light output range between the first and second specific points, and a high light output range above said second specific point, and said first table determining said rate of voltage change which is minimum in said intermediate light output range, and said rate of frequency change which is maximum in said intermediate light output range.

7. The electronic ballast as set forth in claim 1, wherein said memory includes a second table in addition to said first table, said second table determining another predetermined relation between the dimming signal and said voltage command as well as said frequency command, which is different from said relation given by said first table, said command processing unit including a selector for deriving said voltage command and said frequency command from selective one of said first and second tables, said command processing unit also including a monitor for monitoring a rate of change in the dimming level intended by the dimming signal and provide a first signal when said rate of change in the dimming level is smaller than a predetermined rate and otherwise provides a second signal, said first signal actuating said selector to derive said voltage command and said frequency command from said first table, and said second signal actuating said selector to derive said voltage command and said frequency command from said second table.

8. The electronic ballast as set forth in claim 1, wherein said command processing unit includes:

a voltage signal generator which generates said voltage command, a first frequency signal generator which generates a first frequency command designating said first frequency, a second frequency signal generator which generates a second frequency command designating said second frequency command, a selector for providing selective one of said first and second frequency commands to said inverter said voltage signal generator being a pulse-width-modulator that gives a PWM signal of which width defines said voltage command, said voltage signal generator producing a timing pulse in synchronize with said PWM signal and providing said timing pulse to said second frequency signal generator, said second frequency signal generator generating said second frequency command and a predetermined time frame each time it receives said timing pulse, and said selector being connected to receive said first frequency command, said second frequency command, and said time frame so that it passes said second frequency command to said inverter only during said time frame and otherwise pass said first frequency command to be issued to said inverter.

9. The electronic ballast as set forth in claim 1, wherein said command processing unit includes a smoothing circuit for smoothing out said first frequency command.

10. The electronic ballast as set forth in claim 1, wherein said command processing unit includes a first smoothing circuit smoothing out said dimming signal, a second smoothing circuit for smoothing out said voltage command, and a third smoothing circuit for smoothing out said frequency command.

11. The electronic ballast as set forth in claim 10, wherein said second and third smoothing circuits have adjustable time constants which determine individual response times by which said voltage command and said frequency command are delayed in driving said DC voltage regulator and said inverter, respectively, said command processing unit including a dimming direction monitor which monitors said dimming signal to provide an upward signal when said dimming signal indicates an increase in the light output level and provide a downward signal when said dimming signal indicates a decrease in the light output level, said dimming direction monitor adjusting said time constants of said second and third smoothing circuits in order to make the response time of said voltage command longer than that of said frequency command in response to said upward signal, and to make the response time of said frequency command longer than that of said voltage command in response to said downward signal.

12. The electronic ballast as set forth in claim 1, wherein said frequency command is a digital signal which is converted by a D/A converter into an analog signal which is fed to a voltage controlled oscillator, said voltage controller receiving said analog signal to drive said inverter at the frequency designated by said frequency command, and said D/A converter being defined by a ladder resistor network or weighted resistor network.

* * * * *